Feb. 7, 1967  K. G. CUNNINGHAM  3,302,625

ENGINE

Filed May 15, 1964  6 Sheets-Sheet 1

INVENTOR.
KELLY G. CUNNINGHAM,
BY
McMorrow, Berman & Davidson
ATTORNEYS.

INVENTOR.
KELLY G. CUNNINGHAM,
BY
McMorrow, Berman & Davidson
ATTORNEYS.

Feb. 7, 1967 K. G. CUNNINGHAM 3,302,625

ENGINE

Filed May 15, 1964 6 Sheets-Sheet 4

INVENTOR.
KELLY G. CUNNINGHAM,
BY
McMorrow, Berman & Davidson
ATTORNEYS.

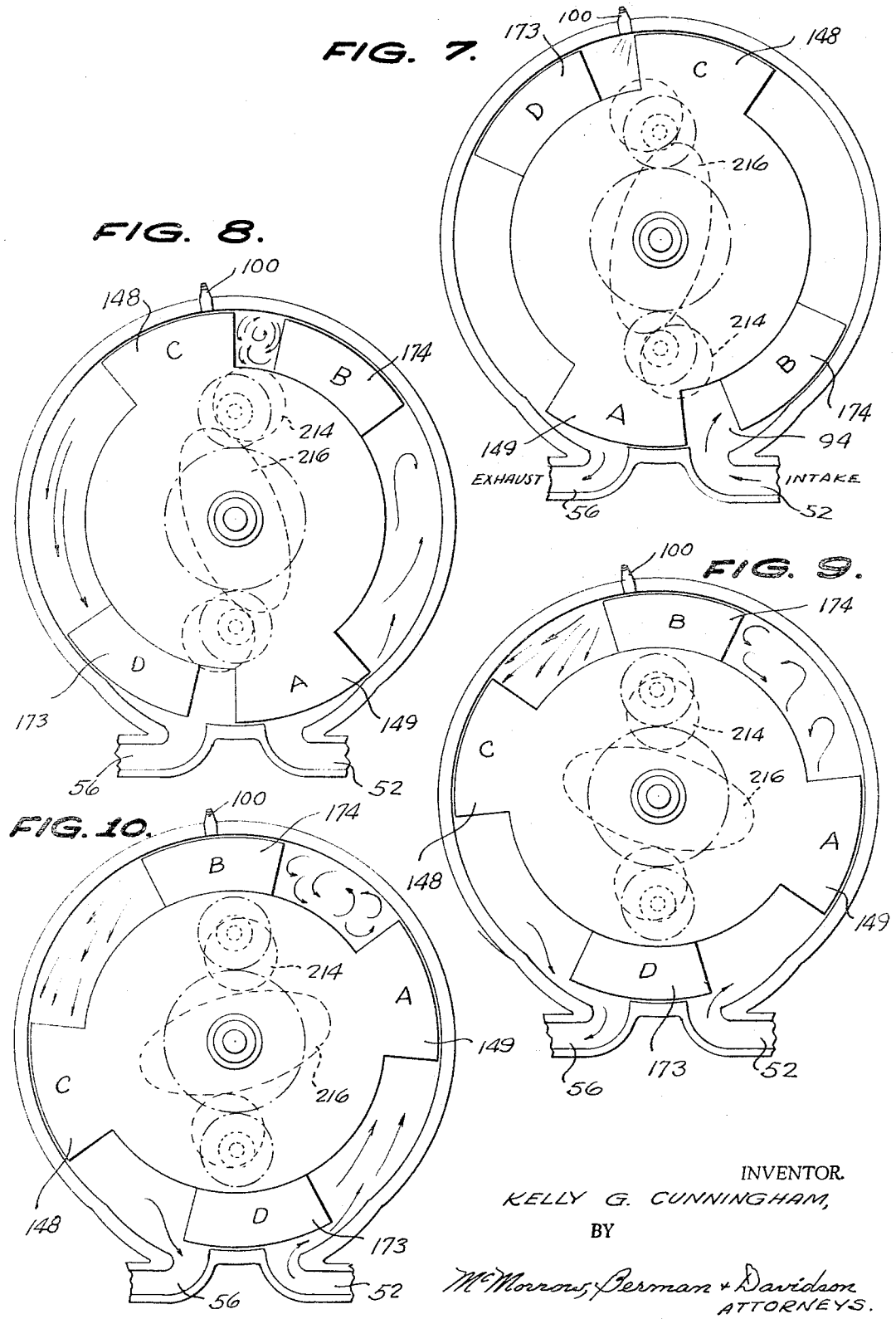

3,302,625
ENGINE
Kelly Gore Cunningham, 1419 Myers Ave.,
Dunbar, W. Va. 25064
Filed May 15, 1964, Ser. No. 367,641
3 Claims. (Cl. 123—11)

This invention pertains to an internal combustion engine of the rotary type, and to control means for the engine.

The basic objective of the invention resides in the provision of an improved rotary internal combustion engine having plural pistons arranged for rotary travel, the engine including an output shaft moved at a substantially constant rate of rotation variable in accordance with fuel flow, the relative positions of the pistons during operation being controlled by a gear assembly—the gear assembly serving to eliminate the necessity for employment of mechanically actuated valve means. A related object is to supply an engine as aforesaid wherein the elements are maintained in a constant, balanced state, resulting in decreased vibration and attendant wear on the elements.

A further object is to provide a rotary engine of simplified construction and assembly, wherein the engine includes constantly moving piston members and the pistons are effectively sealed throughout the various positions.

Another object concerns the provision of a gear type control assembly for a rotary internal combustion engine of the type indicated, the control means being isolated from the remainder of the engine, and the lubrication for the control being isolated from the combustion area of the engine.

Yet another object is to provide effective cooling means for a rotary internal combustion engine.

Other and further objects and advantages of this invention will become apparent to those skilled in the art from a consideration of the following specification when read in conjunction with the annexed drawings, in which:

FIGURES 7 through 9 are diagrammatic sketches showing the relative positions of certain elements of the invention during a cycle of operation.

Construction

The rotary engine 10 of the present invention involves a housing 12 comprised of two main sections, an operating or combustion section 14 and a control section 16.

Figure 2:
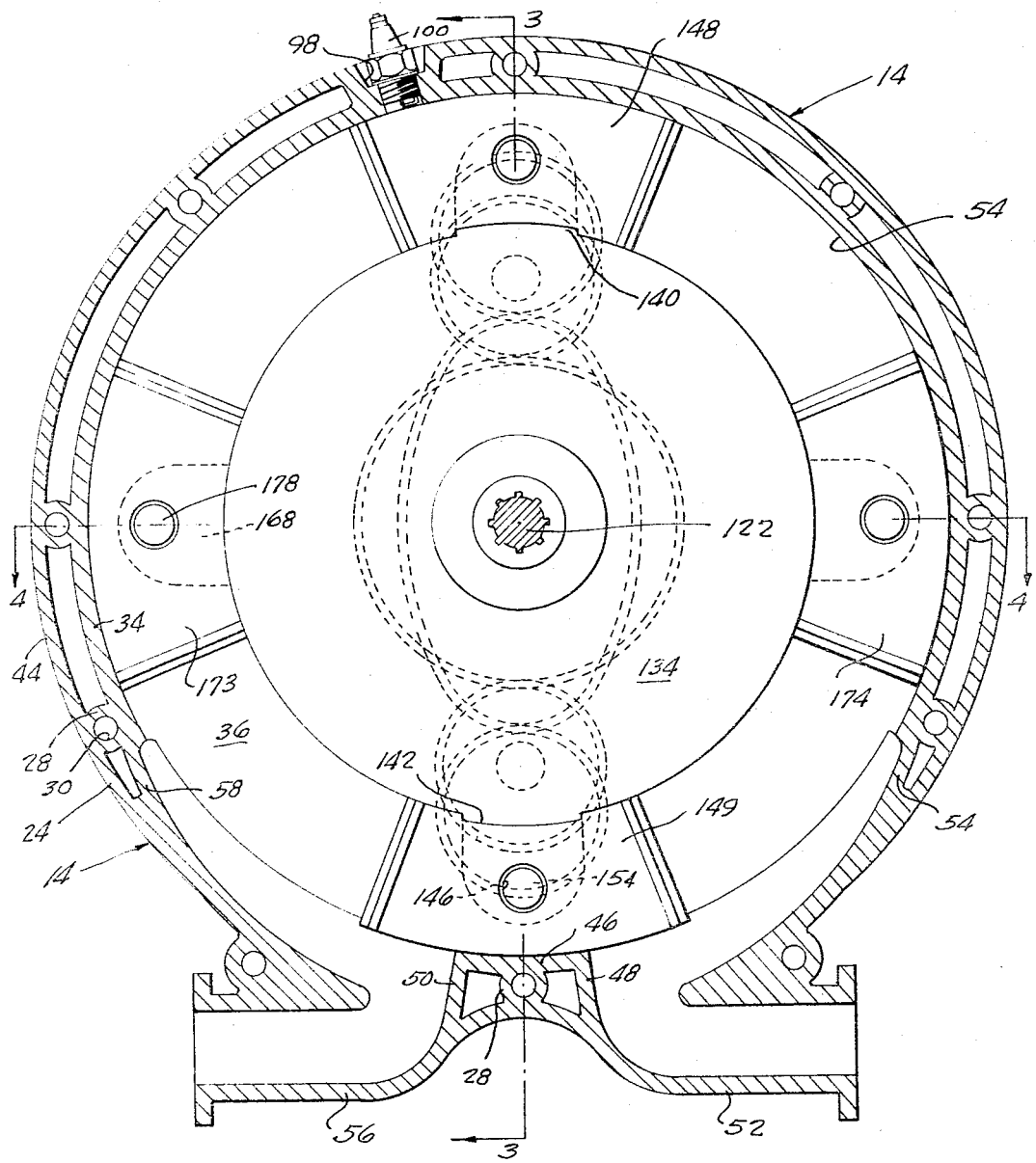
FIGURE 2 is an enlarged cross sectional view of the engine, taken substantially on the section line 2—2 of FIGURE 1, looking in the direction of the arrows.
Figure 3:
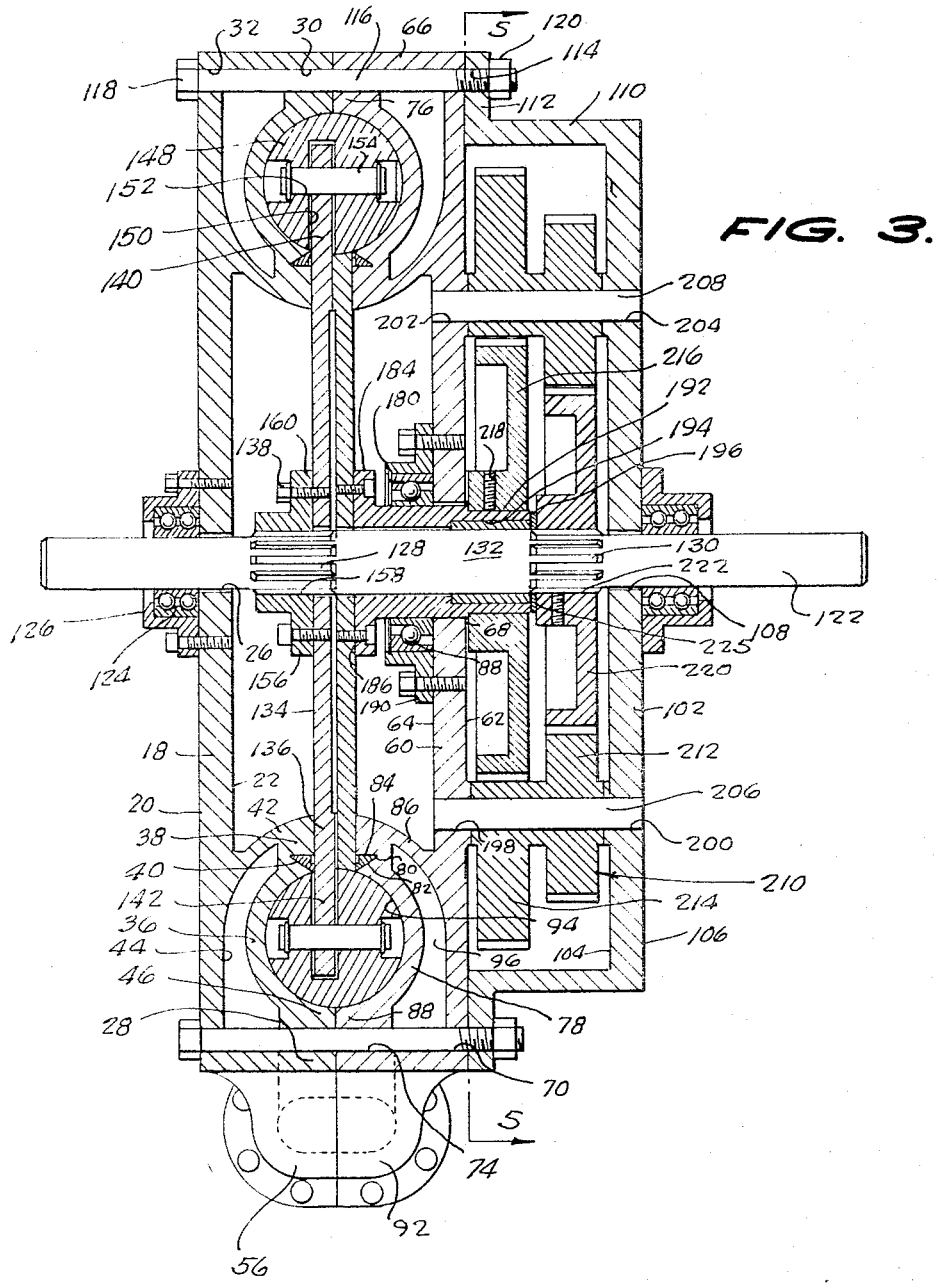
FIGURE 3 is a vertical, sectional view on the line 3—3 of FIGURE 2, looking in the direction of the arrows.
Figure 4:
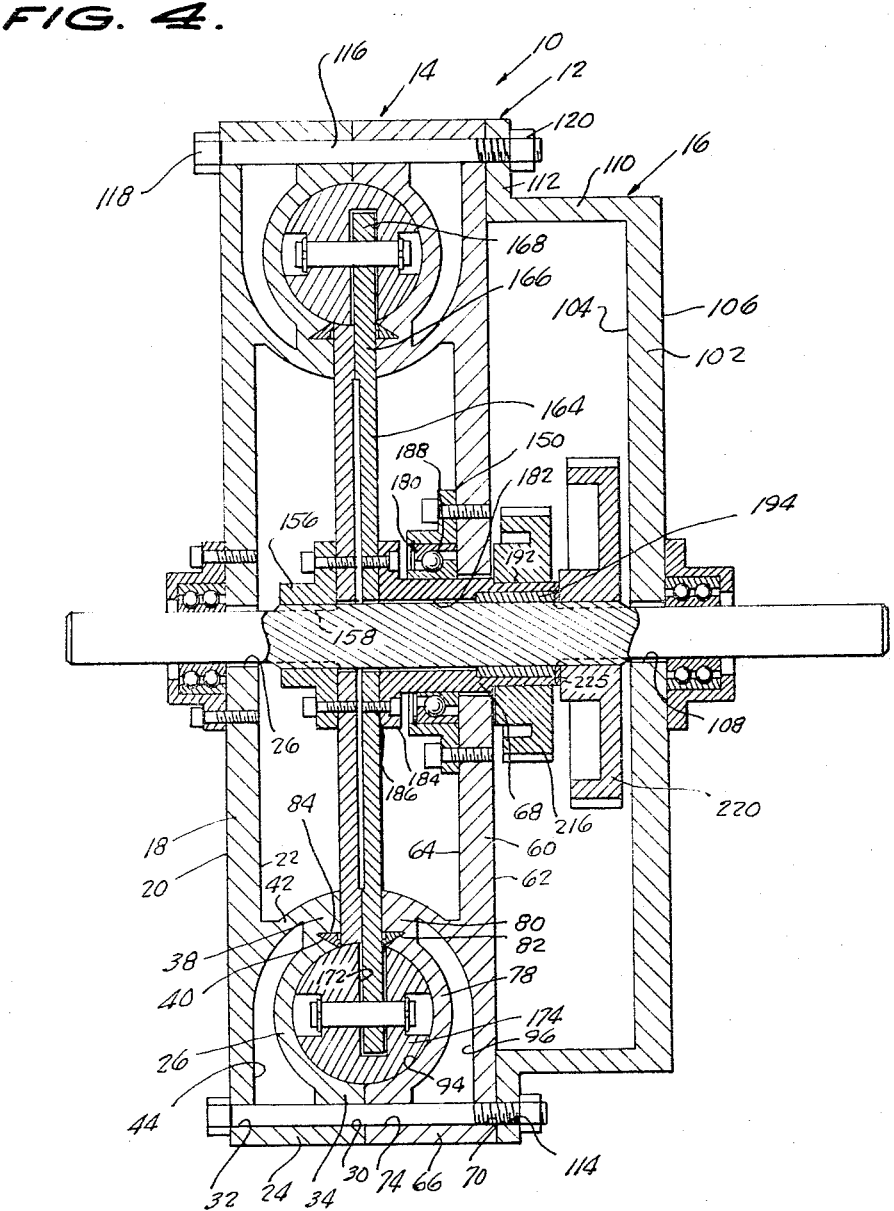
FIGURE 4 is a horizontal, sectional view on the line 4—4 of FIGURE 2, looking in the direction of the arrows.

The operating or combustion section 14 of the housing 12 includes a generally discoidal outer wall 18 which has an outer face 20 and an inner face 22, and a peripheral flange or end wall 24 projects integrally therefrom. A generally central opening 26 is formed in the wall 18. Projecting inwardly from the end wall 24 are a plurality of boss members 28 with holes 30 formed therein in transverse alignment with a like plurality of openings 32 formed in the outer wall 18 adjacent its peripheral edge. Secured to the boss members 28 is a rim portion 34 of an annular casing wall 36 of substantially semicircular cross section. Wall 36 has an inward lip 38 projecting therefrom, having a continuous slot 40 formed therein, and an arcuate connection wall 42 extends from the lip 38 to the inner face 22 of the outer housing wall 18. As seen in FIGURES 2, 3, and 4, the wall 36 is spaced from the wall 18 to define an open area or passageway 44 to admit coolant in fluid form therebetween.

Located adjacent a base or bottom of the housing section 14 is a transverse division wall means 46 with inward walls 48 and 50. A flanged intake manifold 52 is located at one side of the division wall means 46, the manifold including a manifold side wall 54—the manifold communicating with the wall 36. On the other side of the division wall means 46 is a flanged outlet manifold 56 with an exhaust manifold side wall 58 merging into the wall 36.

Referring to FIGURES 3 and 4, it is seen therein that the combustion housing 14 further includes a substantially discoidal inner wall 60 with opposite faces 62, 64, and having a peripheral, inwardly directed end wall 66 meeting in edge-to-edge contact with the end wall 24. The inner wall 60 has an enlarged central opening 68 formed therein, and has peripheral edge openings 70 therein aligned with the openings 32. Bosses 72 are aligned with the bosses 28, and have openings 74, and an interior rim 76 mates with the rim 34. An annular wall 78 extends from the rim 76, and terminates in a lip 80 with a slot 82 therein opposite the slot 40, the lips 80 and 38 being spaced apart a selected distance, and resilient seals 84 being located in the slots 40 and 82. An arcuate connection wall 86 connects the lip 80 and the face 64 of the wall 60. In FIGURE 3, it is seen that a division wall means 88 is provided for cooperation with the means 46, and that intake and exhaust manifold means 90 and 92 comprise mirror images of the means 52, 56 and cooperate therewith to provide fuel intake means and means for expulsion of the products of combustion. As shown in FIGURES 3 and 4, the annular walls 36 and 38 form an annular chamber 94 within the section 14, described in more detail below. Wall 78 is spaced from the inner wall 60 to provide a coolant passageway 96.

Thus, the section 14 of the housing 12 comprises two similar halves with upstanding sidewalls 18 and 60, and peripheral end walls 24 and 66. The annular casing walls 36 and 78 disposed within the section define the annular chamber 94 which is divided by the means 46 and 88 interposed between the intake and exhaust manifolds, and as seen in FIGURE 2, the section line 3—3 may be referred to for reference herein as dividing the section laterally as the central axis thereof. At a circumferential location at least past the central axis in a path traveling from the intake manifold toward the exhaust manifold (counterclockwise), the end wall 66 has a countersunk opening 98 therein, receiving a spark plug 100 or like ignition device, connected to an energy source (not shown). As shown in FIGURE 2, the ignition device opeing 98 extends fully to the chamber 94 and the ignition device 100 fires therein.

The control section 16 includes a housing comprising a discoidal plate 102 with inner and outer sides 104 and 106, and having a central opening 108 formed therein in axial alignment with the openings 26 and 68. A peripheral, inwardly directed end wall 110 extends from the plate 102 and has an outward continuous flange 112 with spaced apertures 114 formed therein aligned with the openings 32 and 70. As shown in FIGURES 3 and 4, elongated, substantially cylindrical bolts 116 with enlarged heads 118 at one end and nuts 120 at there other ends extend through such openings, thereby clamping the halves of the section 12, and the section 16, to one another in the organization shown.

An elongated, substantially cylindrical shaft 122 extends through the housing and is mounted in bearings 124 secured in brackets 126 connected on the outer side 20 of the wall 18 and the outer side 106 of the plate 102. The shaft 122 has a first spline means 128 thereon disposed in the operating section of the housing, and a second group of splines 130 in the control section. Between the splines 128 and 130, the shaft has an enlarged central section 132.

Figure 6:
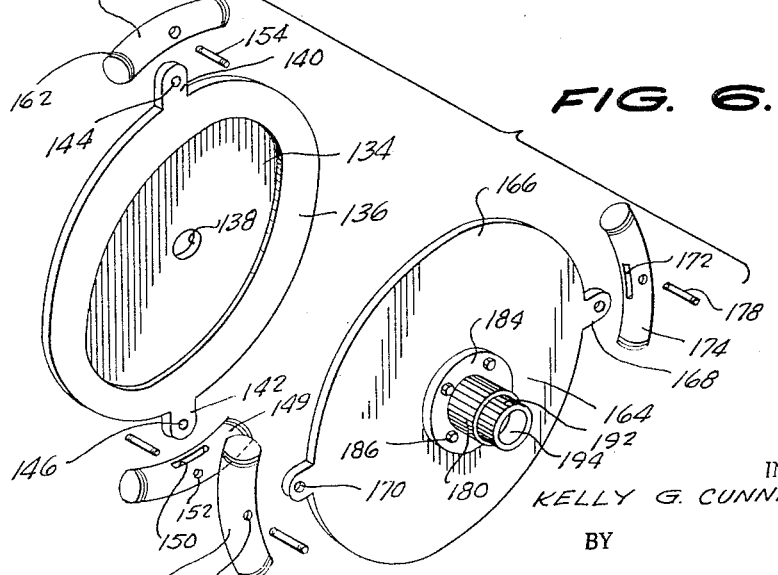
FIGURE 6 is a disassembled perspective view of the piston means thereof and related components.

A first, substantially discoidal plate 134 (FIGURE 6), with an enlarged outer rim 136 is supplied, and has a central opening 138 of a diameter to fit about the shaft 122 and over the first spline means 128. Arms 140, 142 extend radially outward from the plate rim 136 on diametrically opposite sides thereof, and have openings 144, 146 formed therein. A pair of curved pistons 148, 149 are provided, and each has a slot 150 formed therein and opening on its inner side to receive the arms 140 and 142, and in FIGURE 3, it will be noted that slots 150 are laterally offset from the central axis of the piston. The pistons further have transverse openings 152 intersecting the slots 150 and aligned with the arm openings 144 and 146, and lock pins 154 are extended therethrough, locking the pistons on the arms. A collar 156 with means 158 thereon interlocking with the first spline means 128 is fitted about the shaft 122 and bolts 160 secure the collar to the plate 134 on the side thereof adjacent the housing wall 18. Thus, plate 134 is mounted fixedly to the shaft 122 which must rotate with the plate responsive to movement of the pistons 148, 149 in the chamber 94. As shown in the drawings in FIGURES 3 and 4, the enlarged rim 136 of the plate rides in the space between the lips 38 and 80 occupying substantially one-half of such space and bearing against the seal 84 in the opeing 40. Conventional piston rings 162 fit about the forward and trailing ends of the pistons 148, 149, thus providing chamber sealing means.

A second substantially discoidal plate 164 similar to the first plate is provided and includes an enlarged rim 166 and diametrically opposite arms 168. Arms 168 have openings 170 formed therein and extend into offset slots 172 of the curved pistons 173 and 174 which have transverse through apertures 176 intersecting the slots with lock pins 178 projecting therethrough. The pistons 174 ride in the chamber 94 with the rim 166 disposed in the space between the portion 136 of the plate 134 and the lip 80, the rim 166 bearing against the seal 84 thereof. Due to the oppositely offset slots in the piston means, the pistons are adapted for travel in substantially the same arcs and are peripherally co-aligned with respect to each other for travel in the chamber 94.

Plate 164 is secured to a collar 180 with a longitudinal bore 182 therein through which the shaft 122 extends, the collar including a rim 184 and bolts 186 extended through the rim and connecting the same to the plate 164. The collar is mounted for rotation in bearing means 188 contained in a bracket 190 secured to the face 64 of the wall 60 and extends through the central opening 68 thereof. In the control section of the housing, the collar 180 has a reduced end portion 192 and its bore 182 is enlarged at 194 to receive a tubular stabilizing bushing 196.

Figure 5:
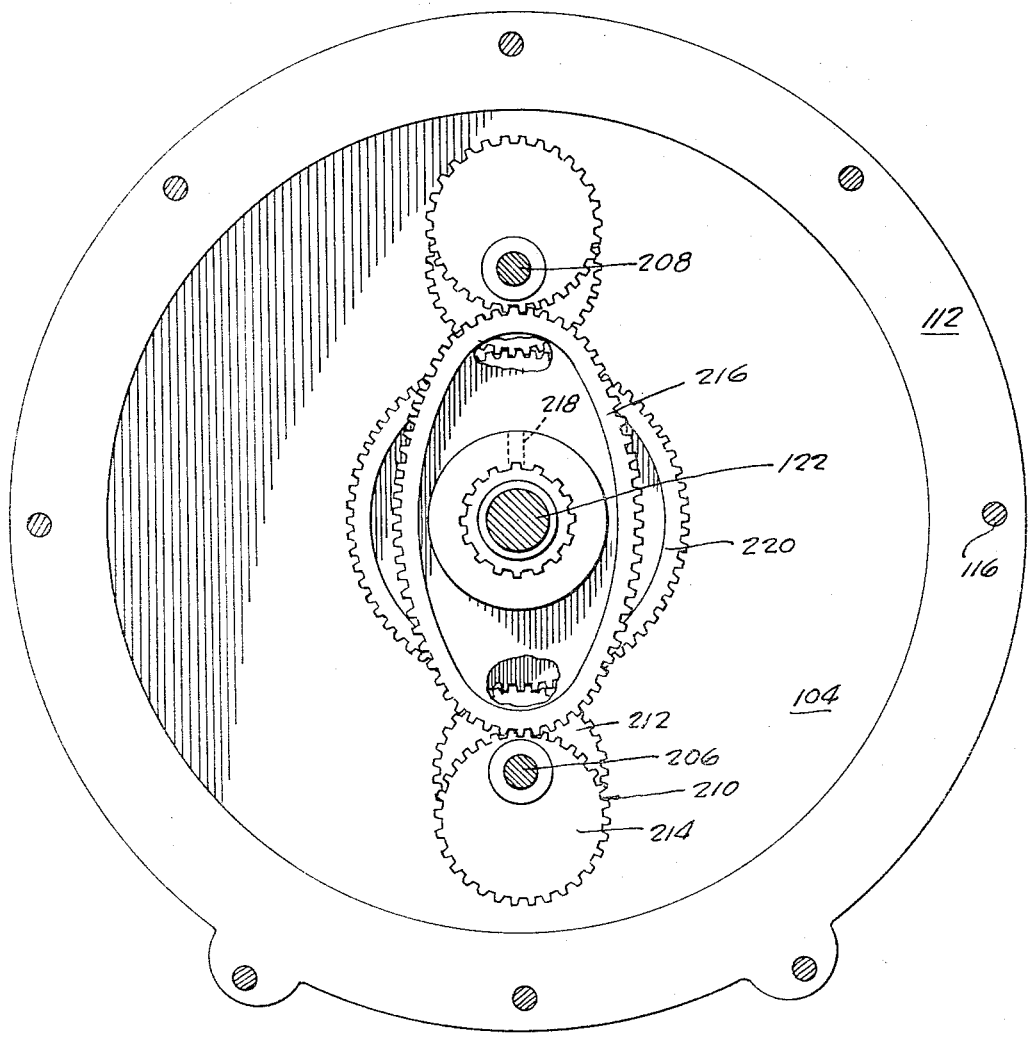
FIGURE 5 is a cross sectional view broken away in part, the section being taken substantially on the line 5—5 of FIGURE 3 showing the control gearing thereof.

A control and power transmission gear arrangement is provided and is housed in the control section 16 of the housing 12. At locations on the vertical diameter of the wall 60 and the plate 102, spaced substantially equidistantly from the shaft 122 are pairs of co-aligned bores 198, 200 and 202, 204, in which are mounted stub axles 206 and 208, respectively. As best seen in FIGURES 3 and 5, these axles have identical compound gears 210 thereon comprised of a gear 212 concentrically mounted about the stub axle, and an eccentrically mounted gear 214. An elliptical gear 216 is fixed to the reduced portion 192 of the collar 180 by pin means 218 and is constantly in mesh with the eccentrically mounted gears 214. A driving gear 220 of circular form is mounted on the shaft 122 and has means 222 interengaged with the second spline means 130 thereon whereby the drive gear 220 is adapted for rotation with said shaft. Gear 220 is constantly meshed with the gears 212, and is spaced from the gear 216 by a washer or spacer 225.

Figure 1:
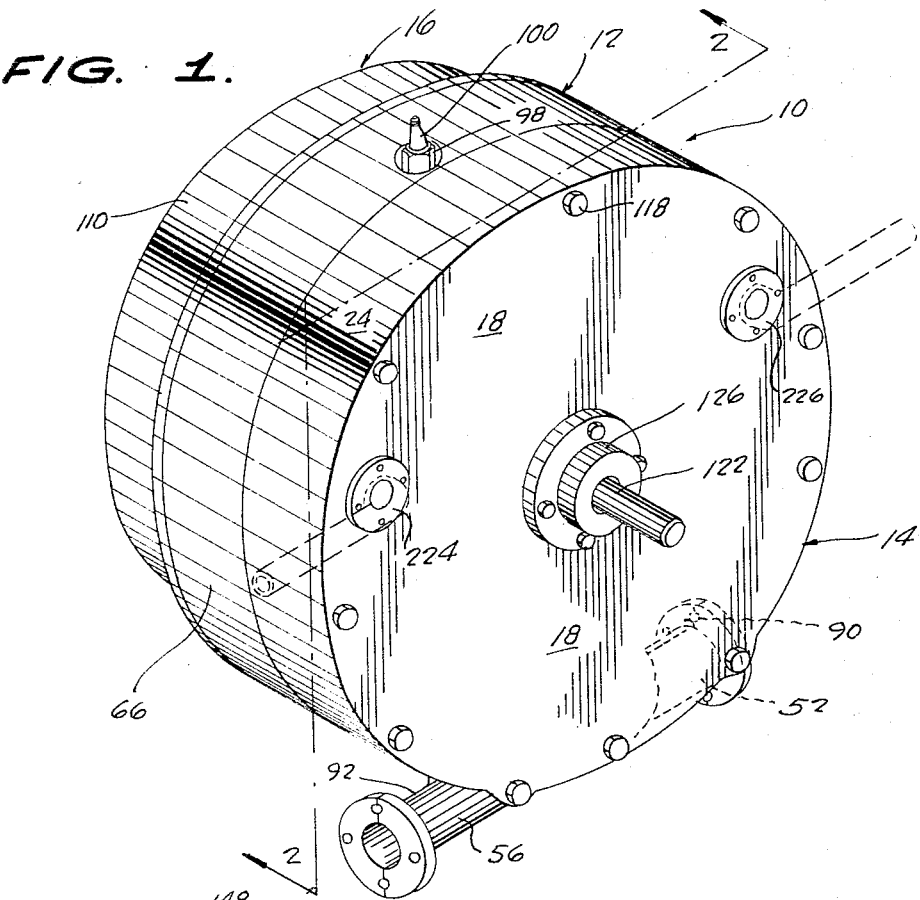
FIGURE 1 is a perspective view of a rotary internal combustion engine constructed and assembled in accordance with the teachings of this invention.

Suitable cooling for the engine in fluid form is provided through conduit means 224, 226 (FIGURE 1) communicating with the coolant chambers in the operating section 14. The section 16 is packed with suitable lubricant which is spaced from the operating section by the wall 60.

*Operation*

Fuel, such as conventional gasoline-air vapors of the usual nature, is supplied to the chamber 94 through the intake manifold 52. The engine is initially started by cranking, rotation being supplied in any suitable manner to the shaft 122. The movement of the pistons in the chamber 94 creates a partial vacuum resulting in suction of the fuel mixture into the chamber from the manifold 52, as indicated by the arrows in FIGURE 2.

Suitable, conventional timing means (not shown) for firing of the ignition means 100 in the chamber, the firing interval being related to the rotational speed of shaft 122, is supplied.

A cycle of operation is shown in FIGURES 7–10, reference also being made to FIGURE 2 showing relative positions of the components. As an initial charge of fuel is drawn into the chamber, between the pistons A and B (149 and 174), the elliptical gear 216 nears a position wherein its major axis is vertically disposed, and at this position, its speed of rotation (being in mesh with the planetary eccentric gears 214) is reduced. As the major axis of the gear 216 passes the vertical and reaches an inclined location in its counter-clockwise rotary path, its speed is gradually increased, thereby increasing the speed of rotation of the pistons B and D (174 and 173) relative to the pistons A and C (149 and 148). This causes a lessening of the distance between the pistons B and the piston C in the area between the intake manifold 52 and the ignition 100, with resultant compression of the fuel prior to ignition. At ignition, the explosion of the fuel creates an expensive force between the pistons in the chamber which, due to the action of the control gearing and the decreased resistance to movement of the pistons on the discharge or exhaust side of the engine causes the leading piston to be thrust forwardly (counter-clockwise) at a rate greater than the rate of the following piston. The products of combustion are then expelled through the exhaust manifold 56.

Simultaneously with the above described intake, compression, power and exhaust functions, similar functions are sequentially occurring between each piston. Thus, a constant operation occurs so long as fuel and ignition are supplied.

The objective of supplying an engine wherein the elements are maintained in constantly balanced status, with consequent reduction in vibration and wear is primarily achieved through the control gearing system wherein the stub axles 206 and 208 are located on diametrically opposite sides of the shaft 122. Thus, with the elliptical gear 216 constantly meshed with the eccentrically mounted gears 214, and circular driving gear 220 being constantly meshed with the concentric gears 212 of the stub axles, as shown in FIGURES 7 through 10, a state of balance exists regardless of the position of the pistons.

Having described and illustrated an embodiment of this invention in some detail, it will be understood that this description and illustration are offered merely by way of example, and that the invention is to be limited in scope only by the appended claims.

What is claimed is:

1. A rotary internal combustion engine for use with a support with a fuel supply and an exhaust system, the engine comprising:

a housing secured to the support and having an operating section and a control section;

a chamber casing assembly, including chamber casing walls, defining an annular chamber, mounted in the operating section of the housing;

the casing walls having inner circumferential edges, the edges being spaced apart to define a slot therebetween, extending the full interior circumference thereof;

a shaft extended through the housing and having first spline means thereon in the operating section and second spline means thereon in the control section;

a first, substantially discoidial plate secured to the first spline means of the shaft for rotation with the shaft and having diametrically opposite arms thereon, the plate extending into the slot between the casing walls;

a curved piston mounted on each of the arms and movable in the chamber;

a second substantially discoidal plate mounted adjacent the first plate about the shaft and having diammetrically opposite second arms thereon;

a second curved piston on each of the second arms, the second plate being disposed in the slot and the second pistons being movable in the chamber;

a transverse division wall at one side of the operating section of the housing;

the casing walls having openings therein on opposite sides of the division wall, one such opening being an inlet opening for fuel, and the other such opening comprising an exhaust port for the products of combustion;

ignition means mounted in the housing and firing at a selected location in the chamber, said location being at least greater than one-half the distance between the inlet opening and the exhaust port, adjacent the exhaust port;

a control gear assembly mounted in the control section of the housing and including a substantially elliptical main gear rotatably mounted on the shaft and connected to the second plate for rotation therewith;

a circular drive gear secured to the second spline means of the shaft;

a pair of stub axles spaced substantially equidistantly on opposite sides of the shaft in the control section;

a first gear mounted on each axle and constantly meshed with the circular gear; and a second, eccentrically mounted gear constantly meshed with the main gear, the main gear rotating with the first plate, and the circular gear rotating with the second plate.

2. A rotary internal combustion engine with a fuel supply and exhaust system, the engine comprising:

a housing having an operating section and a control section;

a chamber casing assembly, including chamber casing walls, defining an annular chamber, mounted in the operating section of the housing;

the casing walls having inner circumferential edges, the edges being spaced apart to define a slot therebetween, extending the full interior circumference thereof;

a shaft extending through the housing and having first spline means thereon in the operating section and second spline means thereon in the control section;

a first, substantially dicoidal plate secured to the first spline means of the shaft for rotation with the shaft and having diametrically opposite arms thereon, the plate extending into the slot between the casing walls;

a curved piston mounted on each of the arms and movable in the chamber;

a second substantially discoidal plate mounted adjacent the first plate about the shaft and having diametrically opposite second arms thereon;

a second curved piston on each of the second arms, the second plate being disposed in the slot and the second pistons being movable in the chamber;

a transverse division wall at one side of the operating section of the housing;

the casing walls having openings therein on opposite sides of the division wall, one such opening having an inlet opening for fuel, and the other such opening comprising an exhaust port for the products of combustion;

ignition means mounted in the housing and firing at a selected location in the chamber, said location being at least greater than one-half the distance between the inlet opening and the exhaust port, adjacent the exhaust port;

a control gear assembly mounted in the control section of the housing and including a substantially elliptical main gear rotatably mounted on the shaft and connected to the second plate for rotation therewith;

a circular drive gear secured to the second spline means of the shaft;

a pair of stub axles spaced substantially equidistantly on opposite sides of the shaft in the control section;

a first gear mounted on each axle and constantly meshed with the circular gear; and a second, eccentrically mounted gear on each shaft constantly meshed with the main gear and fixed to the first gears, respectively, the main gear rotating with the first plate, and the circular gear rotating with the second plate.

3. A rotary internal combustion engine with a fuel supply and exhaust system, the engine comprising:

a housing having an operating section and a control section;

a chamber casing assembly, including chamber casing walls, defining a chamber, mounted in the operating section of the housing;

the casing walls having a space therebetween;

a shaft extending through the housing having first spline means thereon in the operating section and second spline means thereon in the control section;

a first plate secured to the first spline means of the shaft for rotation with the shaft and having arms thereon, the plate extending into the space between the casing walls;

a piston mounted on each of the arms and movable in the chamber;

a second plate mounted adjacent the first plate about the shaft and having second arms thereon;

a second piston on each of the second arms, the second plate being disposed in the slot and the second pistons being movable in the chamber;

a division wall at one side of the operating section of the housing;

the casing walls having openings therein on opposite sides of the division wall, one such opening being an inlet opening for fuel, and the other such opening being an exhaust port for the products of combustion;

ignition means mounted in the housing and firing at a selected location in the chamber adjacent the exhaust port;
a control gear assembly mounted in the control section of the housing and including a substantially elliptical main gear rotatably mounted on the shaft and connected to the second plate for rotation therewith;
a circular drive gear secured to the second spline means of the shaft;
a pair of stub axles spaced substantially equidistantly on opposite sides of the shaft in the control section;
a first gear mounted on each axle and constantly meshed with the circular gear; and
a second, eccentrically mounted gear on each stub axle constantly meshed with the main gear and fixed to the first gear, respectively, the main gear rotating with the first plate, and the circular gear rotating with the second plate.

References Cited by the Examiner

UNITED STATES PATENTS

| | | | |
|---|---|---|---|
| 1,482,628 | 2/1924 | Bullington | 123—11 |
| 1,644,564 | 10/1927 | Bullington. | |
| 1,726,461 | 8/1929 | Weed | 123—11 |
| 1,921,747 | 8/1933 | Greve. | |
| 1,944,875 | 1/1934 | Bullington | 123—11 X |
| 2,046,989 | 7/1936 | Winter | 123—11 |
| 3,203,405 | 8/1965 | Sabet | 123—11 |

FOREIGN PATENTS

| | | |
|---|---|---|
| 684,714 | 3/1930 | France. |
| 1,275,423 | 10/1961 | France. |

MARK NEWMAN, *Primary Examiner.*

F. T. SADLER, *Assistant Examiner.*